(12) United States Patent
Park et al.

(10) Patent No.: US 10,107,361 B2
(45) Date of Patent: Oct. 23, 2018

(54) TRANSMISSION FOR VEHICLE

(71) Applicant: Hyundai Motor Company, Seoul (KR)

(72) Inventors: Ki Jong Park, Osan-si (KR); Soon Ki Eo, Ansan-si (KR); Chon Ok Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 374 days.

(21) Appl. No.: 14/819,011

(22) Filed: Aug. 5, 2015

(65) Prior Publication Data

US 2016/0223061 A1    Aug. 4, 2016

(30) Foreign Application Priority Data

Jan. 30, 2015    (KR) ........................ 10-2015-0015296

(51) Int. Cl.
| | |
|---|---|
| *F16H 3/00* | (2006.01) |
| *F16H 3/093* | (2006.01) |
| *F16H 3/10* | (2006.01) |
| *F16H 3/08* | (2006.01) |

(52) U.S. Cl.
CPC ............. *F16H 3/006* (2013.01); *F16H 3/093* (2013.01); *F16H 3/10* (2013.01); *F16H 2003/007* (2013.01); *F16H 2003/0826* (2013.01); *F16H 2200/0052* (2013.01)

(58) Field of Classification Search
CPC ......... F16H 2003/007; F16H 2003/008; F16H 2003/0803; F16H 2003/0815; F16H 2003/0935; F16H 2003/0938; F16H 37/021; F16H 61/688; F16H 3/006; F16H 3/095; F16H 3/10

USPC .................................. 74/330, 331, 333, 340
See application file for complete search history.

(56) References Cited

U.S. PATENT DOCUMENTS

| | | | |
|---|---|---|---|
| 8,495,925 B2 | 7/2013 | Pesola et al. | |
| 9,453,558 B2 * | 9/2016 | Wittkopp | F16H 3/006 |
| 9,670,991 B2 * | 6/2017 | Eo | F16H 3/006 |
| 2012/0000743 A1 * | 1/2012 | Wittkopp | F16H 3/006 |
| | | | 192/219.1 |

(Continued)

FOREIGN PATENT DOCUMENTS

| | | |
|---|---|---|
| JP | 2005-195115 A | 7/2005 |
| JP | 2013-119280 A | 6/2013 |

(Continued)

*Primary Examiner* — Victor L Macarthur
*Assistant Examiner* — Joseph Brown
(74) *Attorney, Agent, or Firm* — Morgan, Lewis & Bockius LLP

(57) ABSTRACT

A transmission for a vehicle may include a first input shaft continuously receiving power from an engine, a second input shaft selectively receiving power from the engine, a first output shaft and a second output shaft disposed in parallel with the first input shaft and the second input shaft, an initial shift device including a plurality of driving gears on the second input shaft, a plurality of driven gears on the first output shaft and the second output shaft for making a series of gear shift ranges, and a plurality of synchronizers selectively making a predetermined gear shift range of the gear shift ranges made by the driving gears and the driven gears, a duplicate shift device configured to make duplicate gear shift ranges, a first output gear disposed on the first output shaft to draw power from the first output shaft, and a one-way clutch.

13 Claims, 15 Drawing Sheets

(56) References Cited

U.S. PATENT DOCUMENTS

2013/0263682 A1* 10/2013 Eo .................... F16H 3/006
                                                  74/331
2015/0285340 A1* 10/2015 Kim ................. F16H 3/006
                                                  74/330

FOREIGN PATENT DOCUMENTS

JP      2013-119882 A      6/2013
KR   10-2012-0043347 A     5/2012

* cited by examiner

TRANSMISSION FOR VEHICLE

CROSS REFERENCE TO RELATED APPLICATION

The present application claims priority to Korean Patent Application Number 10-2015-0015296 filed Jan. 30, 2015, the entire contents of which is incorporated herein for all purposes by this reference.

BACKGROUND OF THE INVENTION

Field of the Invention

The present invention relates to a transmission for a vehicle. More particularly, the present invention relates to the configuration of a transmission that can automatically shift, based on a synchro-mesh type shifting mechanism that is generally used for manual transmissions.

Description of Related Art

In the related art, an Automated Manual Transmission (AMT) includes a clutch actuator for connecting/disconnecting a clutch and a shift actuator for engaging shift gears and disengaging desired shift gears and can automatically shift by operating the clutch actuator and the shift actuator in accordance with the driving states of a vehicle.

However, according to the AMT, it is required to cut torque from the clutch actuator to the AMT in order to disengage a previous shift gear and engage a new desired shift gear by operating the shift actuator, so interruption of torque that is supposed to be supplied to driving wheels from an engine is generated, which interferes with smooth shifting and deteriorates riding comfort.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle that can prevent deterioration of smooth shifting and riding comfort due to torque interruption, can be more conveniently mounted on a vehicle due to a relatively simple and compact configuration, and can contribute to improving fuel efficiency.

According to various aspects of the present invention, a transmission for a vehicle may include a first input shaft continuously receiving power from an engine, a second input shaft selectively receiving power from the engine, a first output shaft and a second output shaft disposed in parallel with the first input shaft and the second input shaft, an initial shift device including a plurality of driving gears on the second input shaft, a plurality of driven gears on the first output shaft and the second output shaft for making a series of gear shift ranges by engaging with the driving gears on the second input shaft, respectively, and a plurality of synchronizers selectively making a predetermined gear shift range of the gear shift ranges made by the driving gears and the driven gears, a duplicate shift device configured to make duplicate gear shift ranges, which have a gear ratio the same as the gear ratio of one or more gear shift ranges of the series of gear shift ranges made by the initial shift device, between the first input shaft and the first output shaft, a first output gear disposed on the first output shaft to draw power from the first output shaft, and a one-way clutch disposed in a power transmission line from the engine to the first output gear through the duplicate shift device to transmit power from the engine only to the first output gear.

The input shaft may be a hollow shaft fitted on the first input shaft and connected to a clutch to selectively receive power from the engine.

The duplicate shift device may achieve a plurality of duplicate gear shift ranges sequentially from a gear shift range having a largest gear ratio of a series of gear shift ranges made among the second input shaft, the first output shaft, and the second output shaft.

When the series of gear shift ranges that are made by the initial shift device includes at least four or more gear shift ranges sequentially from a first gear shift range having a largest gear ratio, the duplicate shift device may be configured to make a first duplicate shift range having a same gear ratio as a gear ratio of the first gear shift range and a second duplicate shift range having a same gear ratio as a gear ratio of the second gear shift range.

The duplicate shift device may include a first duplicate driving gear disposed on the first input shaft and a first duplicate driven gear disposed on the first output shaft in order to make the first duplicate gear shift range, a second-range duplicate driving gear disposed on the first input shaft and a second-range duplicate driven gear disposed on the first output shaft in order to make the second duplicate gear shift range, and a 1&2 duplicate synchronizer for selecting the first duplicate gear shift range or the second duplicate gear shift range from a neutral range.

The first gear shift range and the fourth gear shift range may be made between the second input shaft and the first output shaft by the initial shift device, and the second gear shift range and the third gear shift range may be made between the second input shaft and the second output shaft by the initial shift device.

One or more gear shift ranges having a gear ratio smaller than the gear ratio of the fourth gear shift range may be made between the second input shaft and the second output shaft.

A receive gear for receiving power from the first output shaft may be disposed on the second output shaft, a medium gear may be disposed between the first output gear and the receive gear to transmit power from the first output gear to the receive gear, and a second output gear transferring power from the second output shaft to a differential may be integrally disposed on the second output shaft.

The one-way clutch may be disposed between the first output shaft and the first output gear so that power is transmitted only to the first output gear from the first output shaft.

In the first duplicate driven gear and the second duplicate driven gear, a shift gear and a clutch gear may be separated, and the one-way clutch may be disposed between the shift gear and the clutch gear to transmit power only to the clutch gear from the shift gear.

A hub of the 1&2 duplicate synchronizer may include an inner hub fitted on the first output shaft and an outer hub disposed outside the inner hub to rotate relative to the inner hub and supporting a sleeve, and the one-way clutch may be disposed between the outer hub and the inner hub to transmit power only to the inner hub from the outer hub.

The one-way clutch may be disposed between a flywheel and the first input shaft to transmit power only to the first input shaft from the flywheel of the engine.

A second output gear for drawing power from the second output shaft may be disposed on the second output shaft, and the first output gear of the first output shaft and the second output gear of the second output shaft may be engaged with a ring gear of a differential to transfer power to the differential.

According to the present invention, it is possible to achieve a transmission for a vehicle that can prevent deterioration of smooth shifting and riding comfort due to torque interruption and which has a relatively simple and compact configuration, thus the transmission can be easily mounted in a vehicle and can contribute to improving fuel efficiency.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
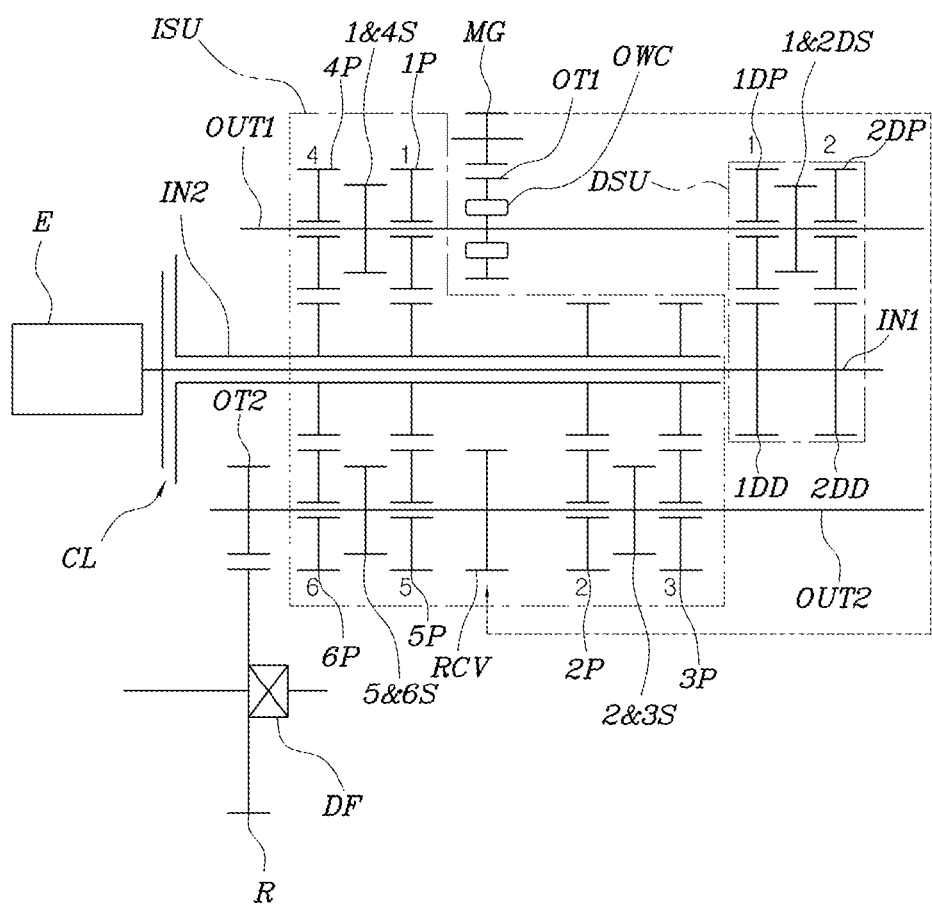
FIG. 1 is a diagram showing an exemplary transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 10 to FIG. 15, embodiments of a transmission for a vehicle according to the present invention, in common, include a first input shaft IN1 that continuously receives power from an engine E, a second input shaft IN2 that selectively receives power from the engine E, a first output shaft OUT1 and a second output shaft OUT2 that are disposed in parallel with the first input shaft IN1 and the second input shaft IN2, an initial shift device ISU that includes a plurality of driving gears on the second input shaft IN2, a plurality of driven gears on the first output shaft OUT1 and the second output shaft OUT2 for making a series of gear shift ranges by engaging with the driving gears on the second input shaft IN2, respectively, and a plurality of synchronizers selectively making a predetermined gear shift range of the gear shift ranges made by the driving gears and the driven gears; a duplicate shift device DSU that makes a duplicate gear shift range, which has a gear ratio the same as the gear ratio of one or more gear shift ranges of the series of gear shift ranges made by the initial shift device, between the first input shaft IN1 and the first output shaft OUT1, a first output gear OT1 disposed on the first output shaft OUT1 to draw power from the first output shaft OUT1, and a one-way clutch OWC that is disposed in the power transmission line from the engine E to the first output gear OT1 through the duplicate shift device DSU to transmit power from the engine E only to the first output gear OT1.

That is, in order to achieve the series of gear shift range for a vehicle, the initial shift device ISU is provided and some the gear shift ranges made by the initial shift device ISU are made in duplicate by the duplicate shift device DSU, so power transmitted from the engine E to the first output gear OT1 through the duplicate shift device DSU passes through the one-way clutch in the transmission line.

The input shaft IN2 is a hollow shaft fitted on the first input shaft IN1 and connected with a clutch CL to selectively receive power from the engine E.

The duplicate shift device DSU can achieve a plurality of duplicate gear shift ranges sequentially from the gear shift range having the largest gear ratio of the series of gear shift ranges made among the second input shaft IN2, the first output shaft OUT1, and the second output shaft OUT2.

That is, for example, when the initial shift device ISU makes six forward gear shift ranges from a first gear shift range having the largest gear ratio to a sixth gear shift range having the smallest gear ratio, the duplicate shift device DSU may make gear ratios the same as those of the first gear shift range having the largest gear ratio and the second gear shift range having the next gear ratio; may make gear ratios the same as those of the first gear shift range, the second gear shift range, and the third gear shift range; may make gear ratios the same as those of the first gear shift range to the fourth gear shift range; or may make gear ratios the same as those of the first gear shift range to the fifth gear shift range.

This is because the duplicate gear shift ranges made by the duplicate shift device DSU plays an important part in preventing torque interruption that is generated in shifting and the torque interruption influences smooth shifting and riding comfort when a vehicle is driven at a low speed with a relatively large gear ratio.

That is, for example, if a vehicle has six forward gear shift ranges, the ranges where there is a problem with smooth shifting or riding comfort due to torque interruption while the vehicle is driven are the first gear shift range to the third gear shift range, but torque interruption does not influence smooth shifting or riding comfort at higher gear shift ranges, because the speed and the inertia of the vehicle are substantially high and large at those ranges. Accordingly, the duplicate shift device DSU makes duplicate gear shift ranges having the same gear ratios as those of low gear shift ranges in order to improve torque interruption that may be generated at the first gear shift range to the third gear shift range.

Obviously, the number of duplicate gear shift ranges that are made by the duplicate shift device DSU may be increased or decreased in accordance with the design concept of a vehicle to be manufactured, but relatively high gear shift ranges having small gear ratios are increased or decreased without changing low gear shift ranges having relatively large gear ratios.

Accordingly, when a series of gear shift ranges that are made by the initial shift device ISU includes at least fourth or more gear shift ranges sequentially from a first gear shift range having the largest gear ratio, the duplicate shift device DSU is configured to make a first duplicate shift range having the same gear ratio as that of the first gear shift range and a second duplicate shift range having the same gear ratio as that of the second gear shift range.

In the various embodiments shown in FIG. 1, and FIG. 10 to FIG. 15, the duplicate shift device DSU includes a first duplicate driving gear 1DD disposed on the first input shaft IN1 and a first duplicate driven gear 1DP disposed on the first output shaft OUT1 in order to make the first duplicate gear shift range, a second duplicate driving gear 2DD disposed on the first input shaft IN1 and a second duplicate driven gear 2DP disposed on the first output shaft OUT1 in order to make the second duplicate gear shift range, and a 1&2 duplicate synchronizer 1&2DS for selecting the first duplicate gear shift range or the second duplicate gear shift range from a neutral range.

The first gear shift range and the fourth gear shift range are made between the second input shaft IN2 and the first output shaft OUT1 by the initial shift device ISU.

The second gear shift range and the third gear shift range are made between the second input shaft IN2 and the second output shaft OUT2 by the initial shift device ISU.

That is, the first gear shift range and the fourth gear shift range are made between the second input shaft IN2 and the first output shaft OUT1, and the second gear shift range and the third gear shift range are made between the second input shaft IN2 and the second output shaft OUT2.

At least one gear shift range having a gear ratio smaller than that of the fourth gear shift range is further made between the second input shaft IN2 and the second output shaft OUT2, and in the various embodiments, a fifth gear shift range and a sixth gear shift range are further made.

The fifth gear shift range is achieved by the driving gear for making the first gear shift range and the sixth gear shift range is achieved by the driving gear for making the fourth gear shift range, so the transmission can be made short and compact.

For reference, the gear disposed on the first output shaft OUT1 to make the first gear shift range is referred to as a first driven gear, the gear disposed on the first output shaft OUT1 to make the fourth gear shift range is referred to as a fourth driven gear, and the synchronizer for selectively connecting the first driven gear 1P or the fourth driven gear 4P to the first output shaft OUT1 is referred to as a 1&4 synchronizer 1&4S.

Further, the gear disposed on the second output shaft OUT2 to make the second gear shift range is referred to as a second driven gear 2P, the gear disposed on the second output shaft OUT2 to make the third gear shift range is referred to as a third driven gear 3P, and the synchronizer for selectively connecting the second driven gear 2P or the third driven gear 3P to the second output shaft OUT2 is referred to as a 2&3 synchronizer 2&3S.

Further, the gear disposed on the second output shaft OUT2 to make the fifth gear shift range is referred to as a fifth driven gear 5P, the gear disposed on the second output shaft OUT2 to make the sixth gear shift range is referred to as a sixth driven gear 6P, and the synchronizer for selectively connecting the fifth driven gear 5P or the sixth driven gear 6P to the second output shaft OUT2 is referred to as a 5&6 synchronizer 5&6S.

This configuration is applied in the same way to all of the various embodiments shown in FIGS. 1, and 10 to 15, and other differences will be described below.

Figure 10:
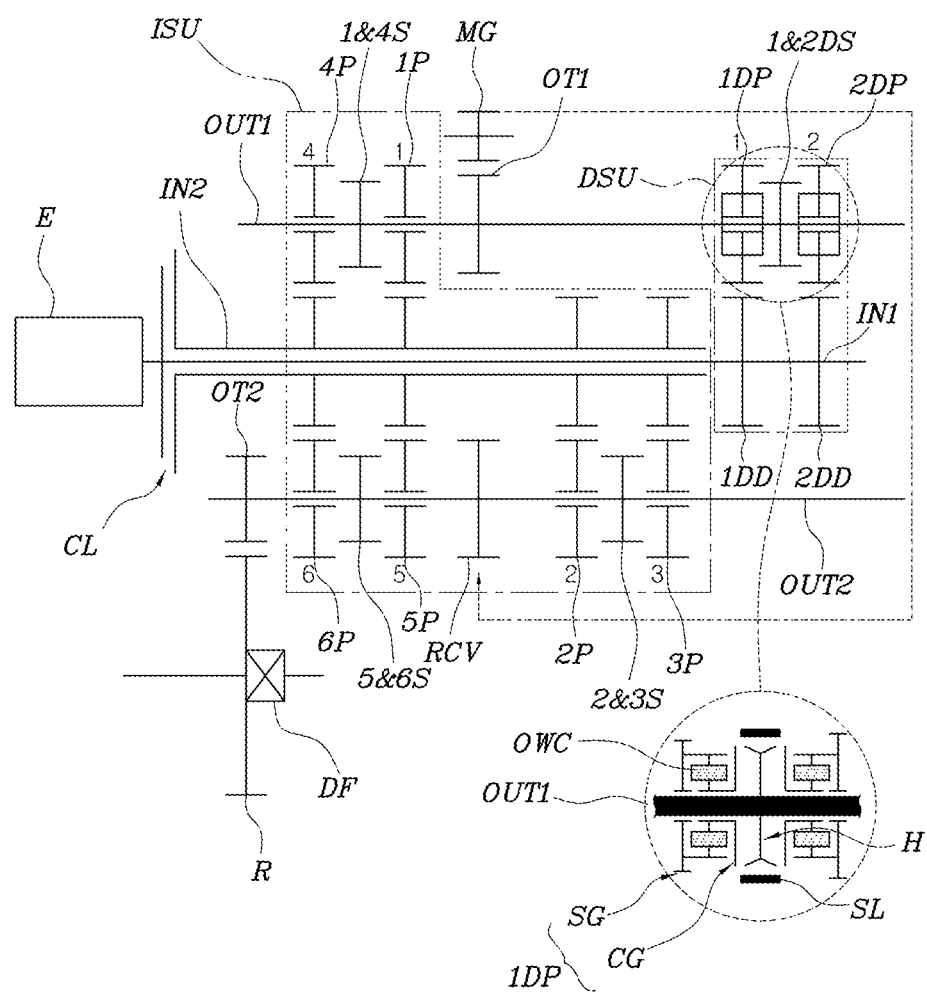
FIG. 10 is a diagram showing a configuration of an exemplary transmission for a vehicle according to the present invention.
Figure 11:
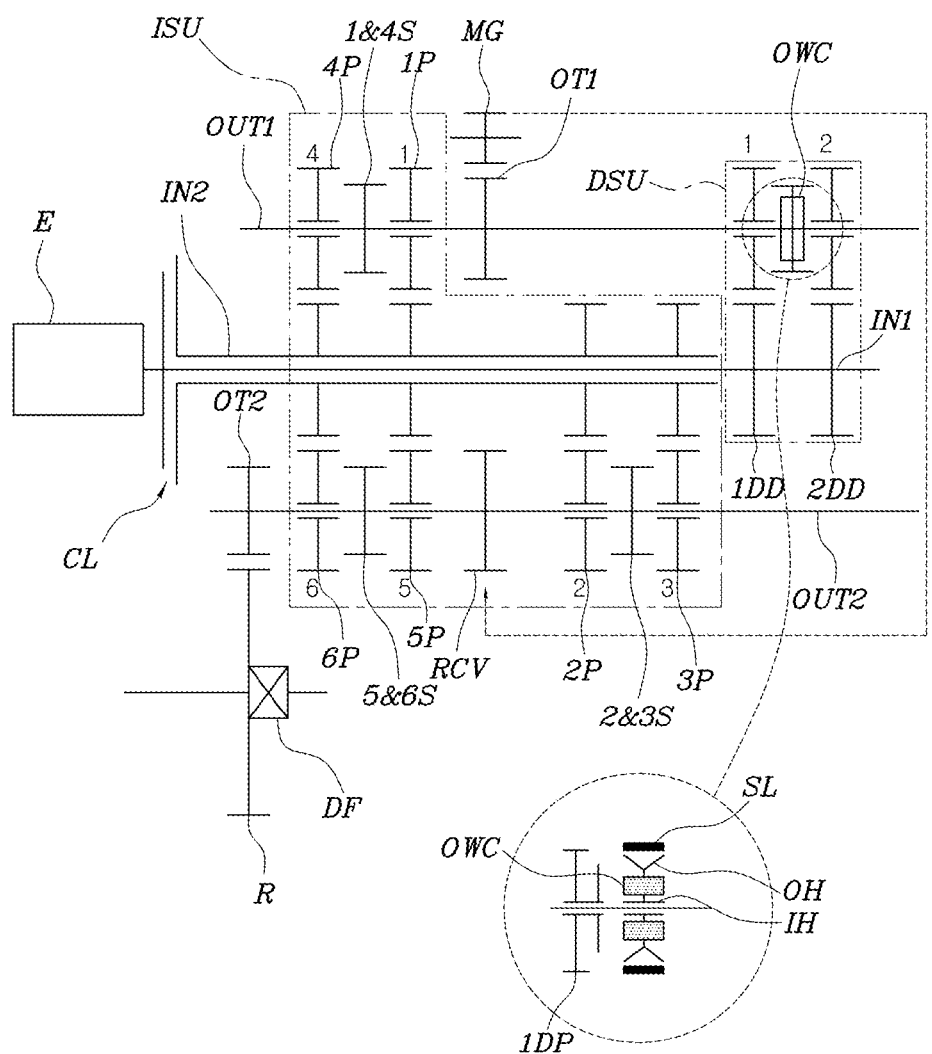
FIG. 11 is a diagram showing a configuration of an exemplary transmission for a vehicle according to the present invention.
Figure 12:
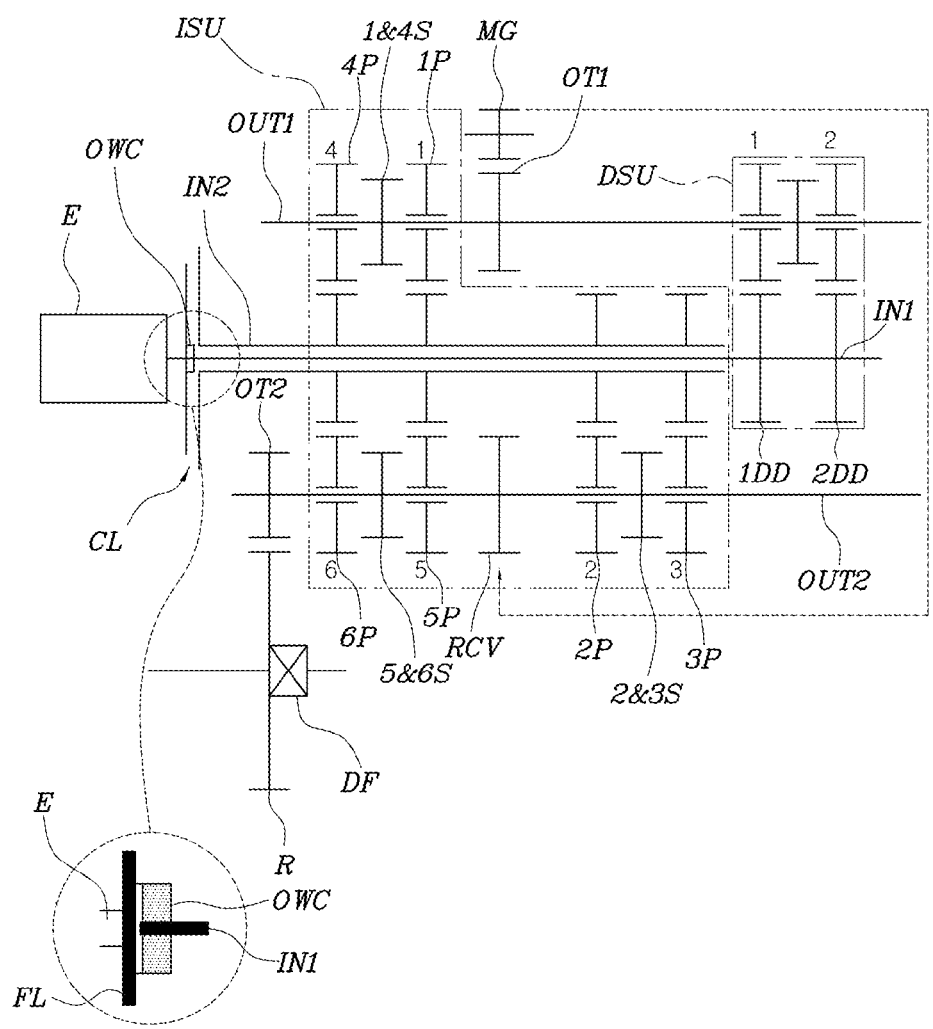
FIG. 12 is a diagram showing a configuration of an exemplary transmission for a vehicle according to the present invention.

In various embodiments shown in FIG. 1, various embodiments shown in FIG. 10, various embodiments shown in FIG. 11, and various embodiments shown in FIG. 12, a receive gear RCV for receiving power from the first output shaft OUT1 is disposed on the second output shaft OUT2, a medium gear MG is disposed between the first output gear OT1 and the receive gear RCV to transmit the power from the first output gear OT1 to the receive gear RCV, and a second output gear OT2 transferring power from the second output shaft OUT2 to a differential DF is integrally disposed on the second output shaft OUT2.

Accordingly, the power from the first output shaft OUT1 is transmitted to the second output shaft OUT2 through the first output gear OT1, the medium gear MG, and the receive gear RCV and then transmitted to a ring gear R of the differential through the second output gear OT2.

In the various embodiments shown in FIG. 1, the one-way clutch OWC is disposed between the first output shaft OUT1 and the first output gear OT1 so that power is transmitted only to the first output gear OT1 from the first output shaft OUT1.

That is, power is transmitted only by the one-way clutch OWC between the first output shaft OUT1 and the first output gear OT1 in the power transmission line from the engine E to the first output gear OT1 through the duplicate shift device DSU and the first output shaft OUT1, so power is not transmitted to the first output shaft OUT1 from the first output gear OT1.

Obviously, in this configuration, the power transmitted to the first output shaft OUT1 through the initial shift device ISU can also be transferred to the differential DF through the first output gear OT1 only through the one-way clutch OWC.

In the various embodiments shown in FIG. 10, in the first duplicate driven gear 1DP and the second duplicate driven gear 2DP, a shift gear SG and a clutch gear CG are separated, and a one-way clutch OWC is disposed between the shift gear SG and the clutch gear CG to transmit power only to the clutch gear CG from the shift gear SG.

For reference, in FIG. 10, a hub H and a sleeve SL are indicated at the right side of the clutch gear CG.

Accordingly, in the various embodiments shown in FIG. 10, in the power transmission line from the engine E to the first output gear OT1 through the duplicate shift device DSU, power is transmitted through the one-way clutch OWC between shift gears SG and the clutch gears CG of the duplicate shift device DSU.

For example, power transmitted through the first duplicate driving gear from the first input shaft IN1 is transmitted to the shift gear SG of the first duplicate driven gear 1DP and then transmitted to the clutch gear CG through the one-way clutch OWC. If the 1&2 duplicate synchronizer 1&2DS is engaged with the clutch gear CG of the first duplicate driven gear 1DP, power passing through the one-way clutch OWC is transmitted to the first output shaft OUT1 and the first output gear OT1 through the 1&2 duplicate synchronizer 1&2DS.

Obviously, in this case, the first output gear OT1 is integrated with the first output shaft OUT1 such that it is not rotated.

In the various embodiments shown in FIG. 11, a hub of the 1&2 duplicate synchronizer 1&2DS is composed of an inner hub IH fitted on the first output shaft OUT1 and an outer hub OH disposed outside the inner hub IH to rotate relatively to the inner hub IH and supporting a sleeve SL, and a one-way clutch OWC is disposed between the outer hub OH and the inner hub IH to transmit power only to the inner hub IH from the outer hub OH.

For example, when the sleeve of the 1&2 duplicate synchronizer 1&2DS is engaged with a first duplicate driven gear 1DP, power from the engine E is transmitted to the outer hub OH through the sleeve, further transmitted to the inner hub IH through the one-way clutch OWC, and then reaches the first output shaft OUT1 and the first output gear OT1.

In the various embodiments shown in FIG. 12, a one-way clutch OWC is disposed between a flywheel FL and a first input shaft IN1 to transmit power only to the first input shaft IN1 from the flywheel FL of the engine E.

As can be seen in common from the various embodiments of FIG. 1 to FIG. 12, the one-way clutch OWC transmits power from the engine E to the differential DF through the duplicate shift device DSU, not in the opposite direction, so interlock between the power transmitted from the engine E to the differential DF through the duplicate shift device DSU and the power transmitted to the differential DF through the initial shift device ISU is structurally prevented and power can be transmitted through the duplicate shift device DSU only when power can be transmitted to the differential DF through the duplicate shift device DSU without interlock of the power.

Figure 13:
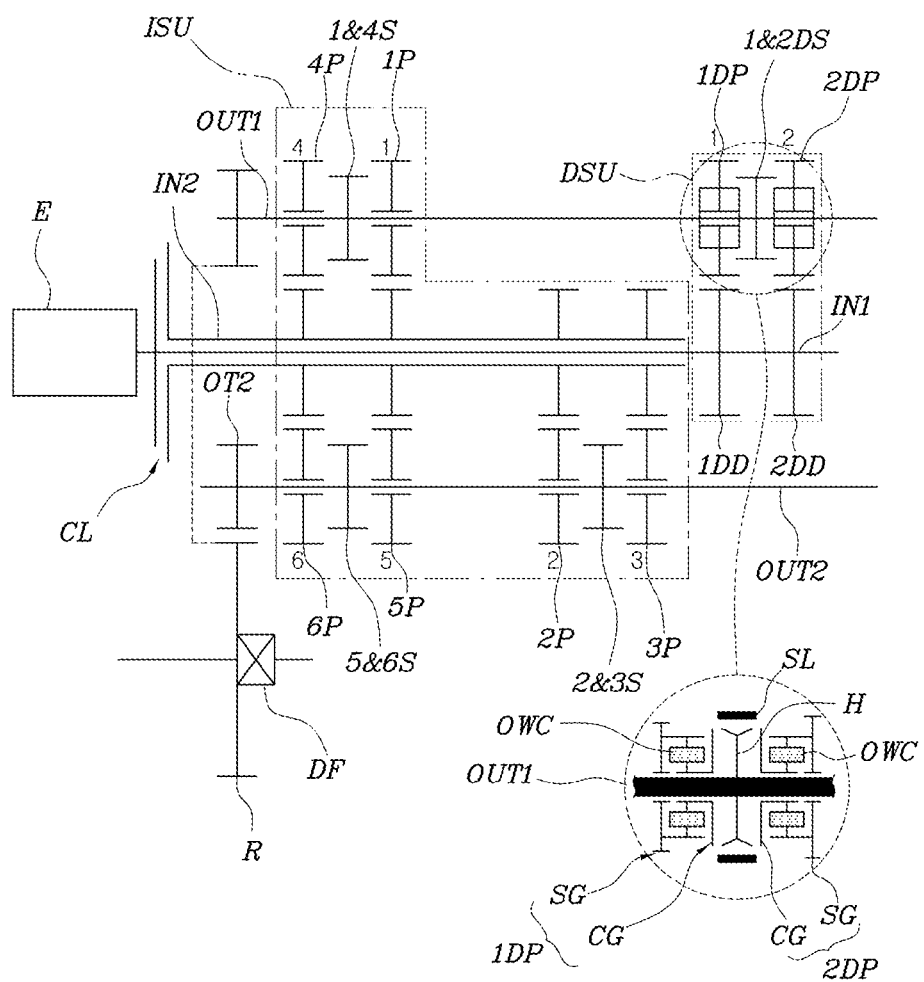
FIG. 13 is a diagram showing a configuration of an exemplary transmission for a vehicle according to the present invention.
Figure 14:
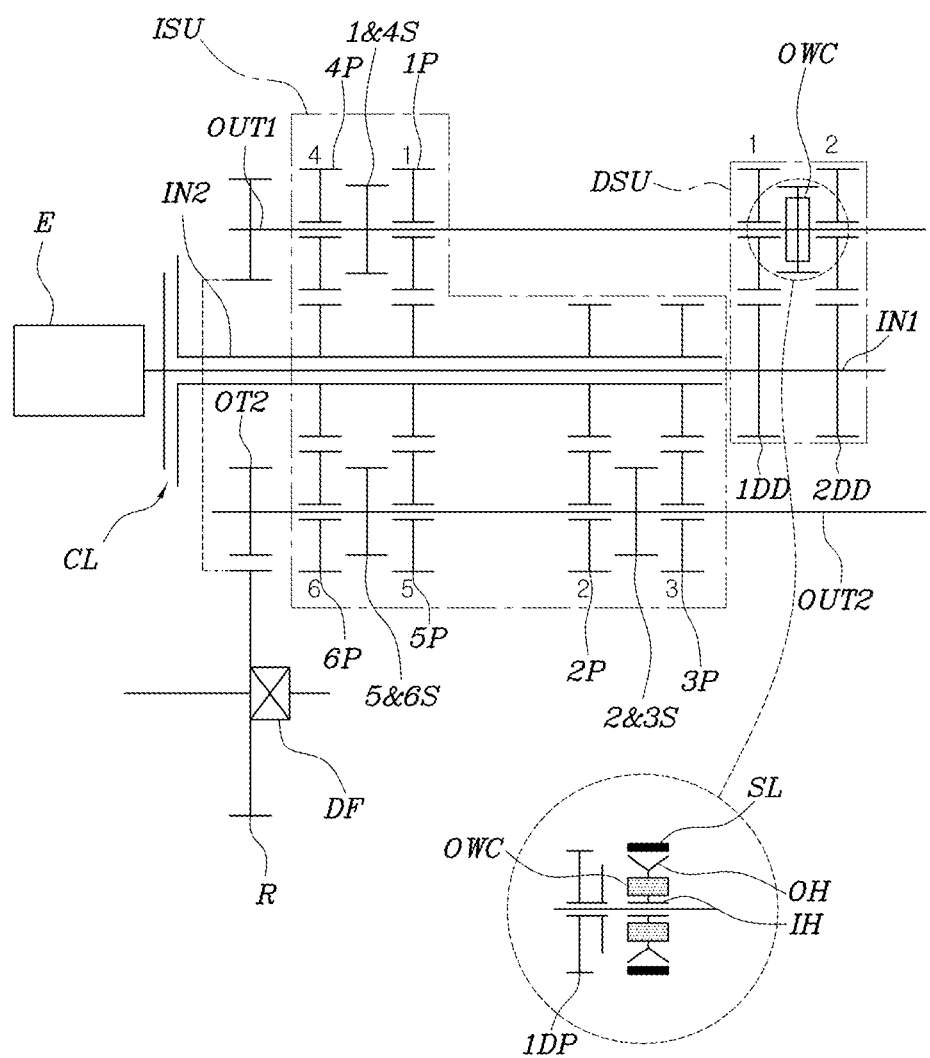
FIG. 14 is a diagram showing a configuration of an exemplary transmission for a vehicle according to the present invention.
Figure 15:
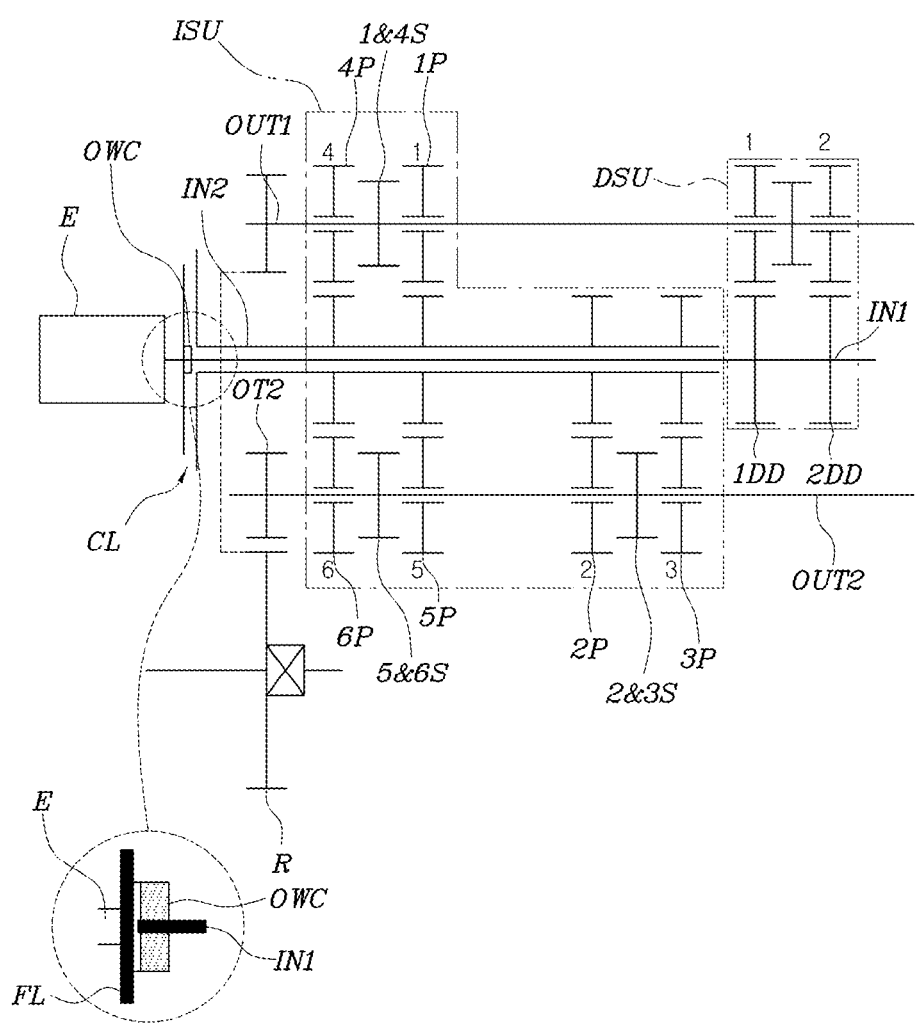
FIG. 15 is a diagram showing a configuration of an exemplary transmission for a vehicle according to the present invention.

Various embodiments shown in FIG. 13, various embodiments shown in FIG. 14, and various embodiments shown in FIG. 15 are different from the various embodiments shown in FIG. 1 to FIG. 12. In these various embodiments, a first output gear OT1 is integrated with a first output shaft OUT1, a second output gear OT2 for drawing power from a second output shaft OUT2 is disposed on the second output shaft OUT2, and a first output gear OT1 of the first output shaft OUT1 and a second output gear OT2 of the second output shaft OUT2 are engaged with a ring gear R of a differential DF to transfer power to the differential DF, so there are no medium gear MG and receive gear RCV.

In the various embodiments shown in FIG. 13, a one-way clutch OWC is installed in the same way as the various embodiments shown in FIG. 10, a shift gear SG and a clutch gear CG are separated in the first duplicate driven gear 1DP and the second duplicate driven gear 2DP, and the one-way clutch OWC is disposed between the shift gear SG and the clutch gear CG to transmit power only to the clutch gear CG from the shift gear SG.

In the various embodiments shown in FIG. 14, a one-way clutch OWC is installed in the same way as the various embodiments shown in FIG. 11, a hub of the 1&2 duplicate synchronizer 1&2DS is composed of an inner hub IH fitted on the first output shaft OUT1 and an outer hub OH disposed outside the inner hub IH to rotate relatively to the inner hub IH and supporting a sleeve SL, and a one-way clutch OWC is disposed between the outer hub OH and the inner hub IH to transmit power only to the inner hub IH from the outer hub OH.

In the various embodiments shown in FIG. 15, a one-way clutch OWC is disposed, in the same way as the various embodiments shown in FIG. 12, between a flywheel FL and a first input shaft IN1 to transmit power only to the first input shaft IN1 from the flywheel FL of the engine E.

The operation is described hereafter with reference to FIG. 2 to FIG. 9 based on the various embodiments shown in FIG. 1.

Figure 2:
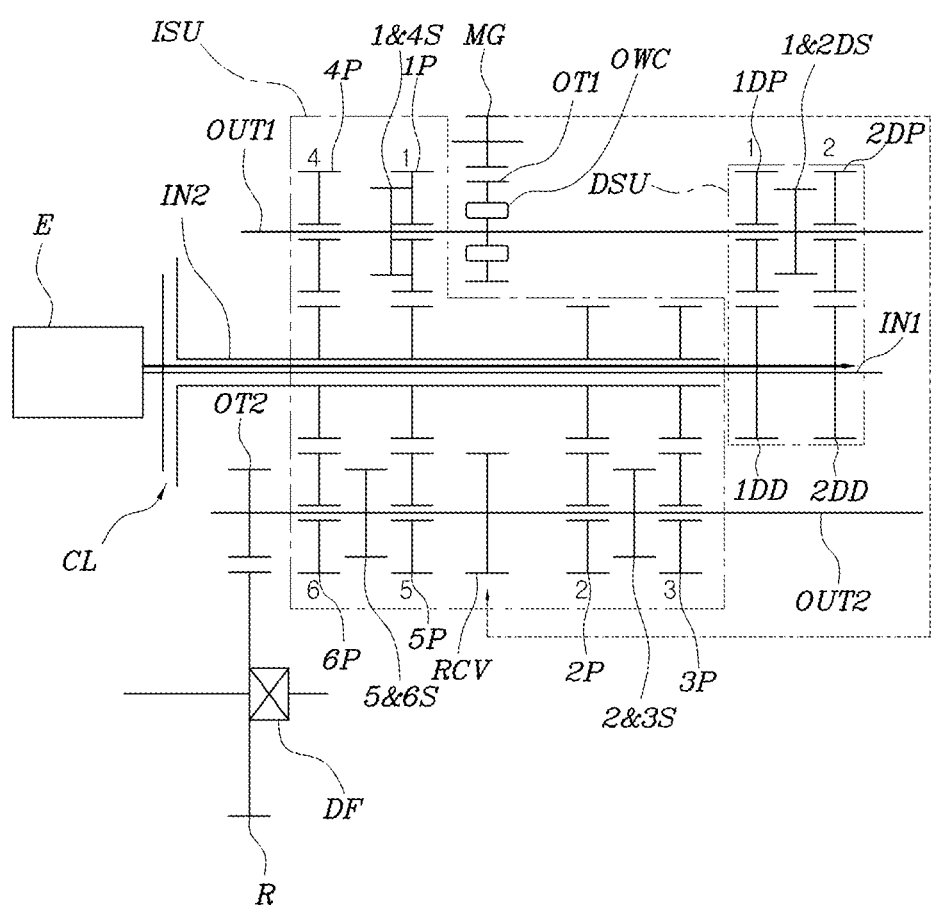
FIG. 2, FIG. 3, FIG. 4 and FIG. 5 are diagrams illustrating operation of the exemplary transmission shown in FIG. 1 from a neutral state to a first gear-driving state.

FIG. 2 shows a case when a first gear shift range is selected to start a vehicle at an N-range for neutral. In this state, the engine E has been started, so the first input shaft IN1 directly connected to the engine E is rotated but the 1&2 duplicate synchronizer 1&2DS is in a neutral state, so power is not transmitted to the first output shaft OUT1. Further, the clutch CL is not engaged, so the power from the engine E is also not supplied to the second input shaft IN2 too. Accordingly, the engine E can be started in this state.

Figure 3:
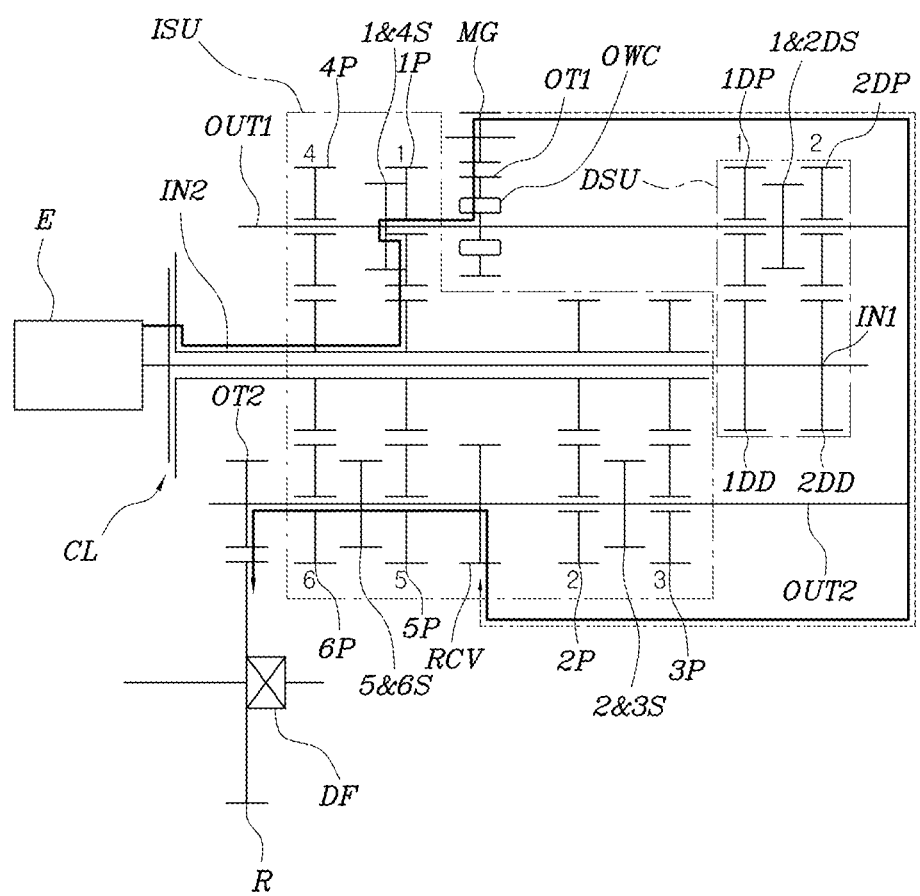

FIG. 3 shows a case when a vehicle is started with the clutch CL engaged from the state of FIG. 2, in which the power from the engine E is transmitted to the first driven gear 1P through the second input shaft IN2 and is transmitted to the first output shaft OUT1 through the 1&4 synchronizer 1&4S, so power is transmitted with the first gear shift range.

The power from the first output shaft OUT1 passes through the one-way clutch OWC and is then transmitted to the second output shaft OUT2 through the first output gear OT1, the medium gear MG, and the receive gear RCV, and the power from the second output shaft OUT2 is transmitted to the differential DF by the second output gear OT2.

Figure 4:
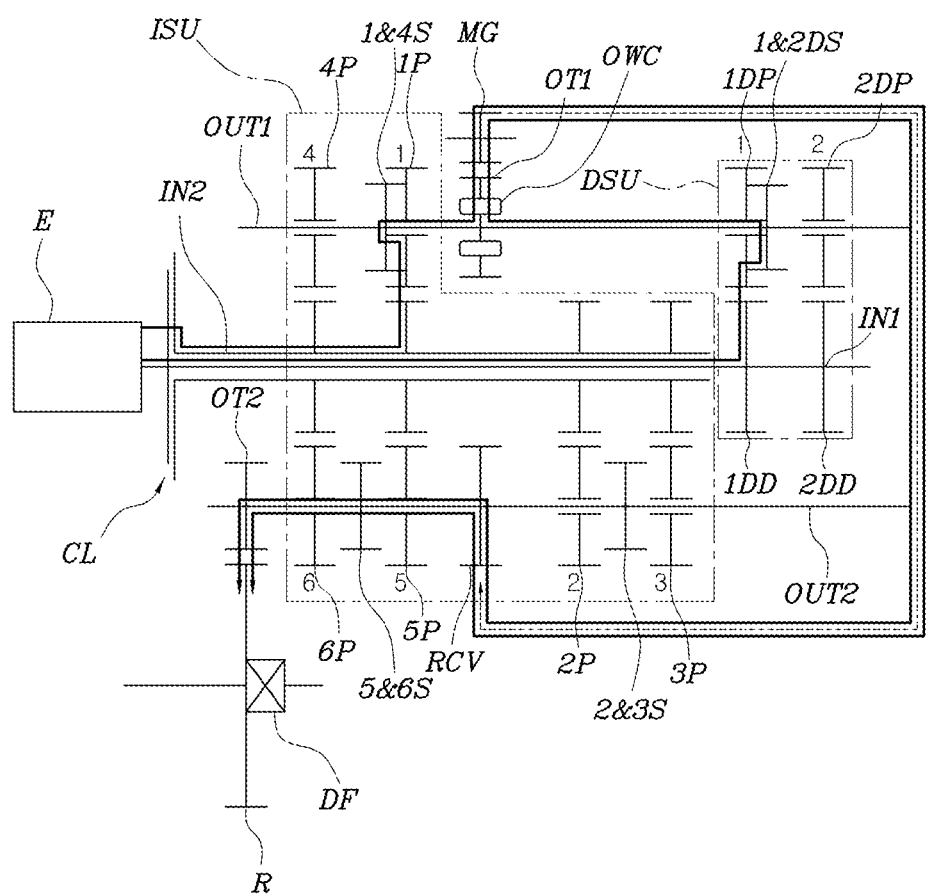

FIG. 4 shows a state that can be achieved after or simultaneously with the state of FIG. 3, in which the first duplicate driven gear 1DP is connected to the first output shaft OUT1 by the 1&2 duplicate synchronizer 1&2DS, so power of the engine E transmitted to the first input shaft IN1 is changed through the first duplicate driving gear 1DD and the first duplicate driven gear 1DP and then transmitted to the first output shaft OUT1.

That is, in this state, the power from the engine E is transmitted simultaneously to driving wheels through the first gear shift range by the initial shift device ISU and the first duplicate gear shift range by the duplicate shift device DSU.

Figure 5:
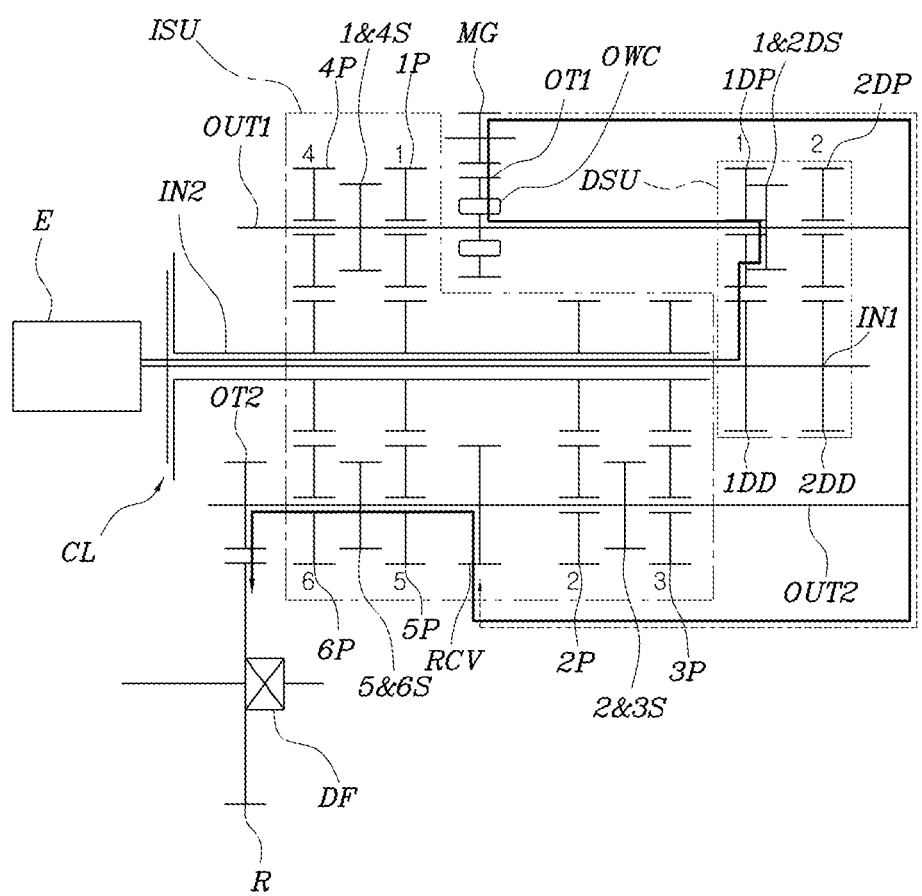

FIG. 5 shows a state when the 1&4 synchronizer 1&4S is disengaged from the state of FIG. 4 to the neutral state so that power is not transmitted through the first gear shift range and the power from the engine E is transmitted to the driving wheels only through the first duplicate shift range, in which power from the first output shaft OUT1 is transmitted to the first output gear OT1 through the one-way clutch OWC.

Substantially, in the vehicle, the gear ratio for the first gear shift range is achieved in all of the states of FIG. 3, FIG. 4, and FIG. 5, but the vehicle is usually driven at the first gear shift ratio in the state of FIG. 5 to prepare the next shifting to the second gear shift range.

For reference, although the clutch CL is engaged in FIG. 5, power is transmitted only through the first input shaft IN1, so the clutch CL may be disengaged after the 1&2 duplicate synchronizer 1&2DS is engaged with the first duplicate driven gear 1DP as shown in FIG. 4, so the clutch CL can be disengaged in the state of FIG. 5.

Figure 6:
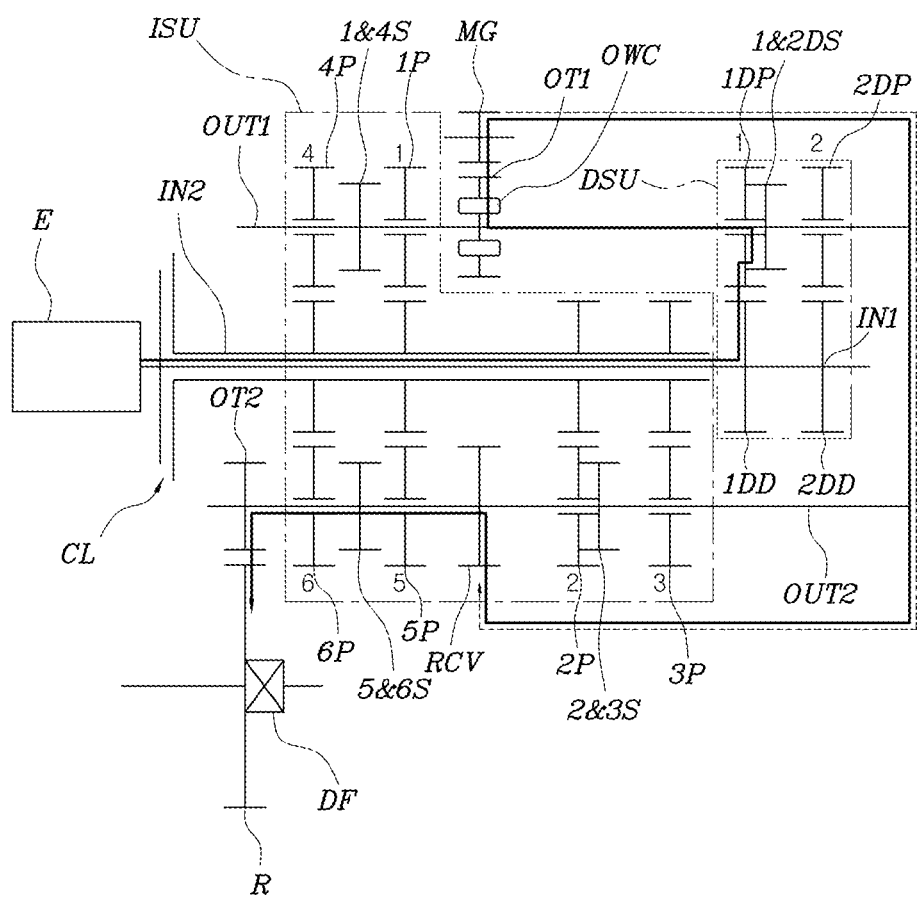
FIG. 6, FIG. 7, FIG. 8 and FIG. 9 are diagrams illustrating operation of the exemplary transmission shown in FIG. 1 from the first gear-driving state to a second gear-driving state.

FIG. 6 shows a case for preparing for shifting to the second gear shift range from the state of FIG. 5, in which the transmission prepares for shifting to the second gear shift ratio by connecting the second driven gear 2P to the second output shaft OUT2 using a 2&3 synchronizer 2&3S, with the clutch CL disengaged. Obviously, the vehicle is driven with the gear ratio for the first gear shift range at the first duplicate gear shift range.

Figure 7:
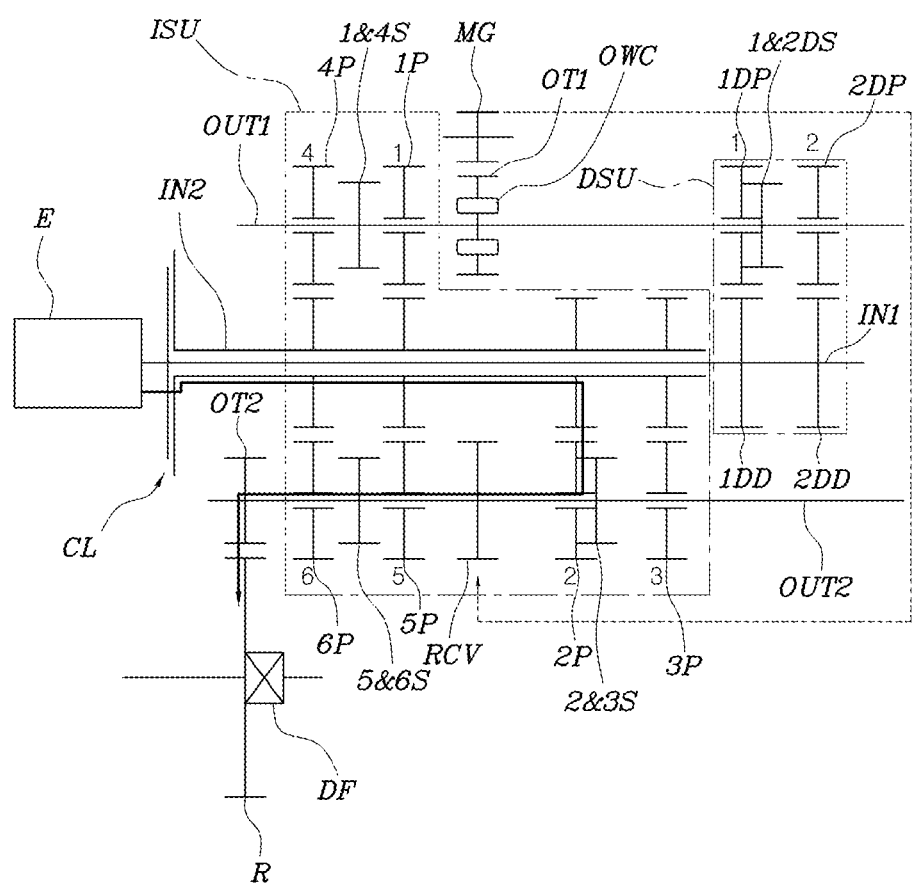

In order to drive the vehicle with the gear ratio for the second gear shift range by the initial shift device ISU from the state of FIG. 6, it has only to engage the clutch CL, as in FIG. 7. That is, the power from the engine E is transmitted to the second output shaft OUT2 through the second driven gear 2P from the second input shaft IN2 and drawn out to the differential DF with the gear ratio for the second gear shift range.

Accordingly, torque interruption is not generated in shifting to the second gear shift range from the first gear shift range, so shifting is more smoothly made and riding comfort is improved.

In this state, the first output shaft OUT1 is operated by the power transmitted through the first duplicate gear shift range, but is not involved with the power transmitted through the second gear shift range by the initial shift device ISU by the one-way clutch, so interlock is not generated and the vehicle is driven with the gear ratio for the second gear shift range by the power transmitted through the second gear shift range.

Figure 8:
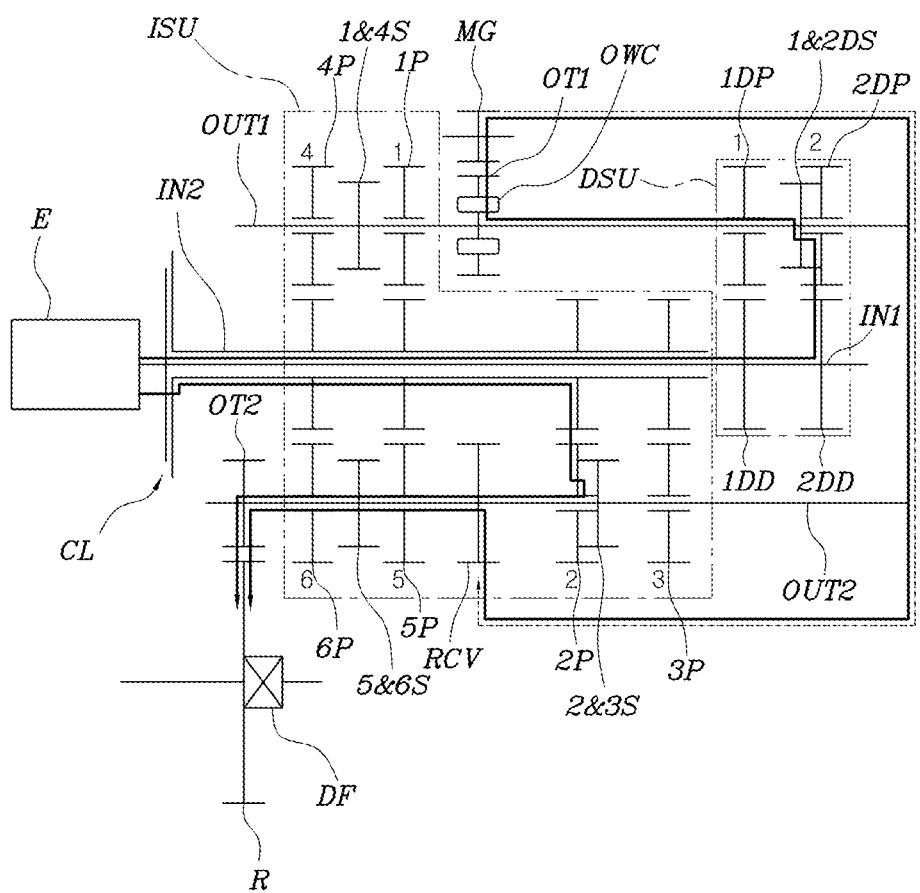

FIG. 8 shows a case when the second duplicate driven gear 2DP is connected to the first output shaft OUT1 by operating the 1&2 duplicate synchronizer 1&2DS from the state of FIG. 7.

In this state, the power from the engine E is transmitted to the differential DF through the second gear shift range by the initial shift device ISU and also through the second duplicate gear shift range by the duplicate shift device DSU.

Figure 9:
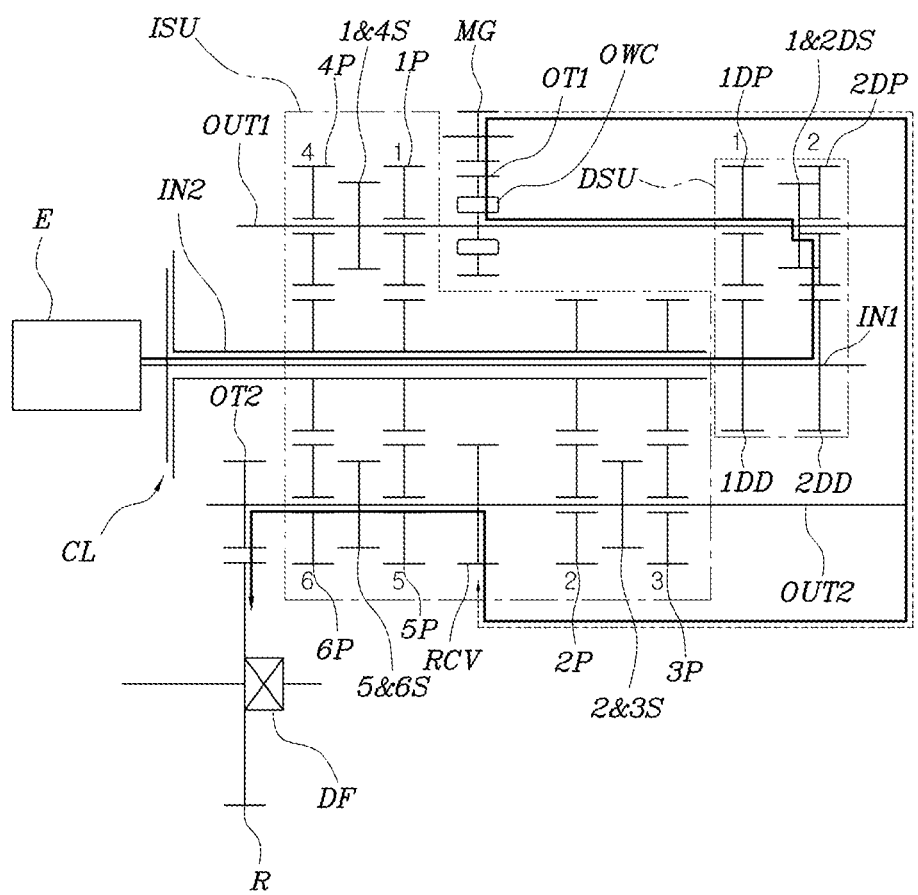

FIG. 9 shows a case when the 2&3 synchronizer 2&3S is disengaged to the neutral state from the state of FIG. 8, in which, similarly, the power from the engine E is continuously transmitted to the differential DF through the second duplicate gear shift range, so the second gear shift range is maintained.

The vehicle is usually driven at the second gear shift range in the state of FIG. 9, and then, similarly, the third driven gear 3P is connected to the second output shaft OUT2 by the 2&3 synchronizer 2&3S with the clutch CL disengaged and then the clutch CL is engaged back, thereby shifting to the third gear shift range from the second gear shift range without torque interruption.

In the various embodiments, shifting to the fourth gear shift range to the sixth gear shift range is made by disengaging the clutch CL, engaging desired gears, and the engaging back the clutch CL, in the same was as an AMT of the related art, so although torque interruption is generated, the speed and inertia of the vehicle are high, so it has little influence on smooth shifting and riding comfort.

That is, for the gear ratios where torque interruption substantially influences smooth shifting or riding comfort of a vehicle, torque interruption is prevented by making a duplicate gear shift range, and the shifting way of the related art is maintained for the next gear ratios, so it is possible to minimize the weight of the transmission and improve smooth shifting and riding comfort.

Obviously, which gear ratio torque interruption is prevented depends on the design concept of a vehicle to be manufactured, and accordingly, the number of duplicate gear shift ranges may be variably determined.

In the various embodiments of FIG. 10 to FIG. 15, shifting is made in almost the same way as the shifting in the various embodiments of FIG. 1 to FIG. 9, and the principle of the one-way clutch OWC that operates such as power is transmitted to driving wheels through the duplicate shift device DSU only when power can be transmitted through the duplicate shift device DSU without interlock between power passing through the initial shift device ISU and the power passing through the duplicate shift device DSU from the engine E is the same, so the detailed description is not provided.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle comprising:
a first input shaft continuously receiving power from an engine;
a second input shaft selectively receiving power from the engine;
a first output shaft and a second output shaft disposed in parallel with the first input shaft and the second input shaft;
an initial shift device including a plurality of driving gears on the second input shaft, a plurality of driven gears on the first output shaft and the second output shaft for making a series of gear shift changes by engaging with the driving gears on the second input shaft, respectively, and a plurality of synchronizers selectively making a predetermined gear shift change of the gear shift changes made by the driving gears and the driven gears;
a duplicate shift device configured to make duplicate gear shift changes which have a gear ratio the same as a gear ratio of one or more gear shift changes of the series of gear shift changes made by the initial shift device, between the first input shaft and the first output shaft;
a first output gear disposed on the first output shaft to draw power from the first output shaft; and
a one-way clutch disposed in a power transmission line from the engine to the first output gear through the duplicate shift device to transmit power from the engine only to the first output gear, wherein the one-way clutch transmits power from the engine towards the first output gear, wherein the duplicate shift device achieves the duplicate gear shift changes sequentially from a gear shift change having a largest gear ratio of the series of gear shift changes made among the second input shaft, the first output shaft, and the second output shaft, wherein when the series of gear shift changes that are made by the initial shift device includes at least four or more gear shift changes sequentially from a first gear shift change having the largest gear ratio, the duplicate shift device is configured to make a first duplicate gear shift change having a gear ratio the same as a gear ratio of the first gear shift change and a second duplicate gear shift change having a gear ratio the same as a gear ratio of a second gear shift change, and wherein the duplicate shift device includes:

a first duplicate driving gear disposed on the first input shaft and a first duplicate driven gear disposed on the first output shaft in order to make the first duplicate gear shift change;

a second duplicate driving gear disposed on the first input shaft and a second duplicate driven gear disposed on the first output shaft in order to make the second duplicate gear shift change; and a 1&2 duplicate synchronizer for selecting the first duplicate gear shift change or the second duplicate gear shift change from a neutral state in which the power of the engine is not transmitted to the first output shaft through the 1&2 duplicate synchronizer.

2. The transmission of claim 1, wherein the second input shaft is a hollow shaft fitted on the first input shaft and connected to a clutch to selectively receive power from the engine.

3. The transmission of claim 1, wherein the first gear shift change and a fourth gear shift change are made between the second input shaft and the first output shaft by the initial shift device, and the second gear shift change and a third gear shift change are made between the second input shaft and the second output shaft by the initial shift device.

4. The transmission of claim 3, wherein one or more gear shift changes having a gear ratio smaller than a gear ratio of the fourth gear shift change are made between the second input shaft and the second output shaft.

5. The transmission of claim 1, wherein a receive gear for receiving power from the first output shaft is disposed on the second output shaft, a medium gear is disposed between the first output gear and the receive gear to transmit power from the first output gear to the receive gear, and a second output gear transferring power from the second output shaft to a differential is integrally disposed on the second output shaft.

6. The transmission of claim 5, wherein the one-way clutch is disposed between the first output shaft and the first output gear so that power is transmitted only to the first output gear from the first output shaft.

7. The transmission of claim 5, wherein in the first duplicate driven gear and the second duplicate driven gear, a shift gear and a clutch gear are separated, and the one-way clutch is disposed between the shift gear and the clutch gear to transmit power only to the clutch gear from the shift gear.

8. The transmission of claim 5, wherein a hub of the 1&2 duplicate synchronizer comprises an inner hub fitted on the first output shaft and an outer hub disposed outside the inner hub to rotate relative to the inner hub and supporting a sleeve, and the one-way clutch is disposed between the outer hub and the inner hub to transmit power only to the inner hub from the outer hub.

9. The transmission of claim 5, wherein the one-way clutch is disposed between a flywheel of the engine and the first input shaft to transmit power only to the first input shaft from the flywheel of the engine.

10. The transmission of claim 5, wherein the one-way clutch is disposed between a flywheel of the engine and the first input shaft to transmit power only to the first input shaft from the flywheel of the engine.

11. The transmission of claim 1, wherein a second output gear for drawing power from the second output shaft is disposed on the second output shaft, and the first output gear of the first output shaft and the second output gear of the second output shaft are engaged with a ring gear of a differential to transfer power to the differential.

12. The transmission of claim 11, wherein in the first duplicate driven gear and the second duplicate driven gear, a shift gear and a clutch gear are separated, and the one-way clutch is disposed between the shift gear and the clutch gear to transmit power only to the clutch gear from the shift gear.

13. The transmission of claim 11, wherein a hub of the 1&2 duplicate synchronizer comprises an inner hub fitted on the first output shaft and an outer hub disposed outside the inner hub to rotate relatively to the inner hub and supporting a sleeve, and the one-way clutch is disposed between the outer hub and the inner hub to transmit power only to the inner hub from the outer hub.

* * * * *